US009049304B2

(12) United States Patent
Hangai

(10) Patent No.: US 9,049,304 B2
(45) Date of Patent: Jun. 2, 2015

(54) INFORMATION DISPLAY SYSTEM, COMMUNICATION TERMINAL, CELLULAR PHONE AND INFORMATION DISPLAY METHOD

(75) Inventor: Tomohisa Hangai, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 379 days.

(21) Appl. No.: 13/519,509

(22) PCT Filed: Dec. 20, 2010

(86) PCT No.: PCT/JP2010/072900
§ 371 (c)(1),
(2), (4) Date: Jun. 27, 2012

(87) PCT Pub. No.: WO2011/081047
PCT Pub. Date: Jul. 7, 2011

(65) Prior Publication Data
US 2012/0302292 A1  Nov. 29, 2012

(30) Foreign Application Priority Data
Dec. 28, 2009  (JP) .................................. 2009-298143

(51) Int. Cl.
*H04M 1/00* (2006.01)
*H04M 3/42* (2006.01)
(Continued)

(52) U.S. Cl.
CPC ...... *H04M 1/72502* (2013.01); *H04M 1/72533* (2013.01); *H04M 1/576* (2013.01); *H04M 2250/12* (2013.01)

(58) Field of Classification Search
CPC ............ H04M 1/576; H04M 1/72502; H04M 1/72533; H04M 2250/12
USPC .............. 701/72; 709/203; 340/3.1, 5.1, 4.62; 386/68, 216; 455/566, 414.1
See application file for complete search history.

(56) References Cited

U.S. PATENT DOCUMENTS

| | | | |
|---|---|---|---|
| 2009/0153288 A1* | 6/2009 | Hope et al. ...................... | 340/3.1 |
| 2011/0058107 A1* | 3/2011 | Sun et al. ....................... | 348/734 |
| 2011/0078348 A1* | 3/2011 | Steinberg et al. ............... | 710/72 |

FOREIGN PATENT DOCUMENTS

| | | | |
|---|---|---|---|
| JP | 2004-228730 A | | 8/2004 |
| JP | 2005-94431 A | | 4/2005 |
| JP | 3131620 U | | 5/2007 |
| JP | 2007-221345 A | | 8/2007 |

(Continued)

*Primary Examiner* — Opiribo Georgewill
(74) *Attorney, Agent, or Firm* — Birch, Stewart, Kolasch & Birch, LLP

(57) ABSTRACT

Each of the cellular phones includes a specification information storage unit for specifying the cellular phone itself, an image information storage unit that stores image information, an operation information creation unit that creates operation information for operating a display image, and a transmission unit that transmits, to the communication terminal, a communication signal including the specification information, the image information and the operation information. The communication terminal includes a reception unit that receives the communication signal from each of the cellular phones, a display information storage unit that stores, as display information, the image information included in the received communication signal, a display unit, and a display control unit for reading out display information of the cellular phone, from the display information storage unit, and for displaying the display information as an image on the display unit, and for controlling the display image displayed on the display unit based on the operation information.

11 Claims, 9 Drawing Sheets

(51) Int. Cl.
*G05B 23/02* (2006.01)
*G05B 19/00* (2006.01)
*H04N 5/932* (2006.01)
*H04N 5/935* (2006.01)
*H04M 1/725* (2006.01)
*H04M 1/57* (2006.01)

(56) References Cited

FOREIGN PATENT DOCUMENTS

| | | |
|---|---|---|
| JP | 2009-100366 A | 5/2009 |
| JP | 3151245 U | 6/2009 |

* cited by examiner

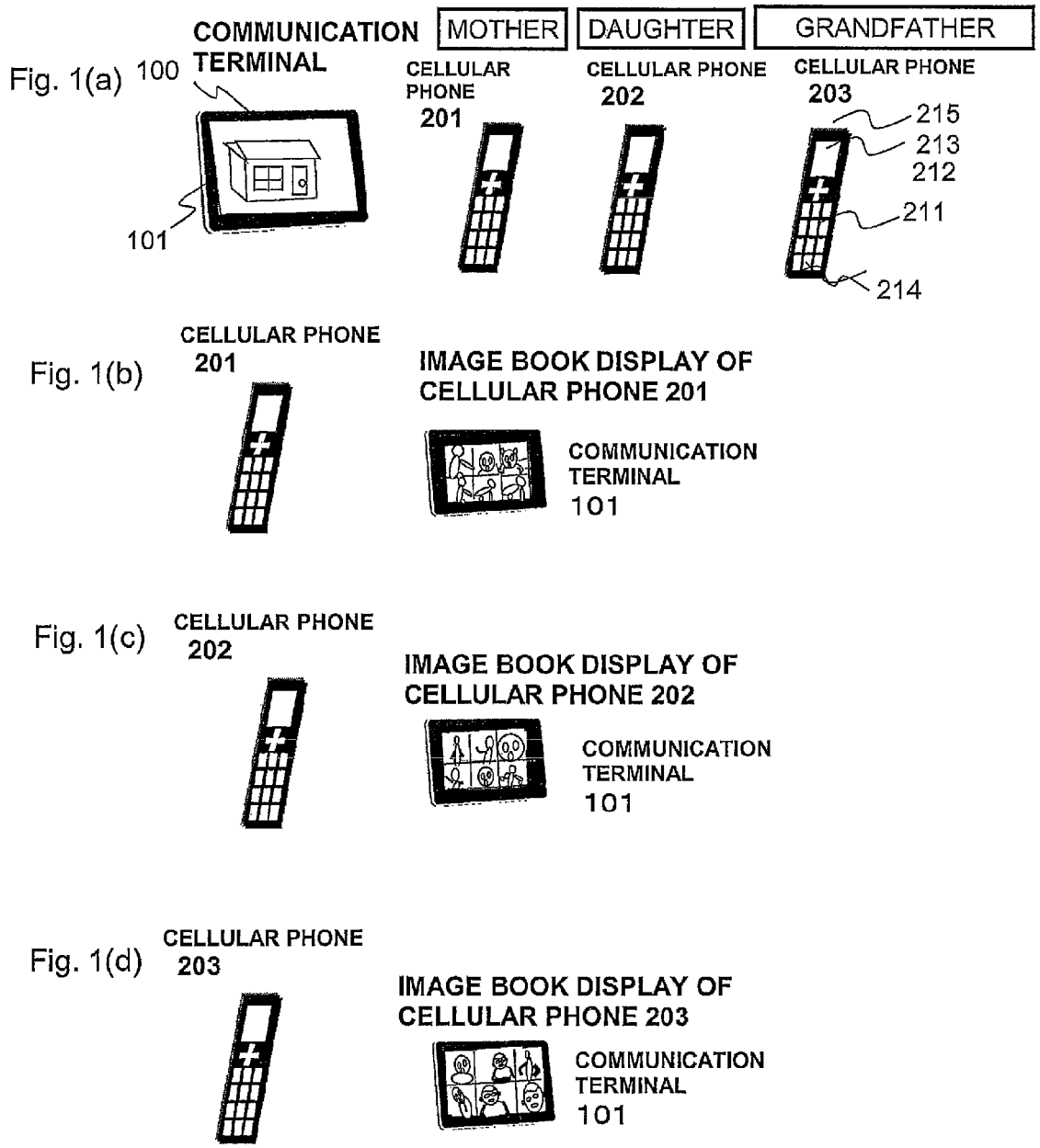

Fig. 2

CELLULAR PHONE   WHEN CELLULAR PHONE 210 IS SHAKEN RIGHT AND LEFT, ONE PICTURE IS TURNED OVER

COMMUNICATION TERMINAL   COMMUNICATION TERMINAL

Fig. 3(a)

UNDER SLIDE SHOW
  COMMUNICATION TERMINAL

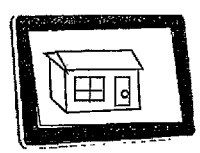

OPERATE CELLULAR PHONE 201 DURING SLIDE SHOW PERFORMED BY DISPLAY DEVICE 100 BY USING ALL PICTURES

Fig. 3(b)

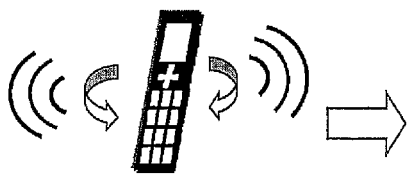

COMMUNICATION TERMINAL   COMMUNICATION TERMINAL

 

SET REMOTE CONTROL OPERATION STATE, AND OPERATE CELLULAR PHONE LIKE DRAWING CIRCLE

SLIDE SHOW OF PICTURES ASSOCIATED WITH CELLULAR PHONE 201 IS IMPLEMENTED

Fig. 5

OWNER DATA INFORMATION DATA MATRIX

| No. | NAME | NUMBER OF CELLULAR PHONE | | | |
|---|---|---|---|---|---|
| | | None | 201 | 202 | 203 |
| 1 | Yamada Taro | ● | | | |
| 2 | Sato Jiro | | ● | | |
| 3 | Tanaka Shiro | | | ● | ● |
| 4 | | | | | |

Fig. 6

DISPLAY INFORMATION DATA MATRIX

| No. | IMAGE | RECOGNITION INFORMATION OF CELLULAR PHONE | | |
|---|---|---|---|---|
| | | Company Name | Model Name | Number |
| 1 | yama.jpg | S Company | TTT | 123456 |
| 2 | sato.jpg | M Company | AAA | 234567 |
| 3 | t4rou.jpg | undefine | undefine | undefine |
| 4 | | | | |

Fig. 7

OPERATION INFORMATION DATA MATRIX

| ACTION | CELLULAR PHONE 201 | | | | CELLULAR PHONE 202 | | | | CELLULAR PHONE 203 | | | |
|---|---|---|---|---|---|---|---|---|---|---|---|---|
| | RIGHT/ LEFT | UP/ DOWN | CLOCK WISE | COUNTER CLOCK | RIGHT/ LEFT | UP/ DOWN | CLOCK WISE | COUNTER CLOCK | RIGHT/ LEFT | UP/ DOWN | CLOCK WISE | COUNTER CLOCK |
| ONE PAGE TURNING OVER | ● | | | | ● | | | | ● | | | |
| SLIDE SHOW | | | ● | ● | | | ● | | | | ● | ● |
| REVERSE SLIDE SHOW | | | | | | | | ● | | | | |
| SCHEDULE | | | | | | ● | | | | | | |
| CALENDAR | | | | | | | | | | ● | | |
| TIMEPIECE | | ● | | | | | | | | | | |

INFORMATION DISPLAY SYSTEM, COMMUNICATION TERMINAL, CELLULAR PHONE AND INFORMATION DISPLAY METHOD

TECHNICAL FIELD

This invention relates to an information display system, a communication terminal, a cellular phone and an information display method, and more specifically, relates to an information display system that displays, on a display terminal, a display image stored by a cellular phone, and controls the display image by an operation of the cellular phone, to a communication terminal and a cellular phone, which are used in this information display system, and to an information display method.

BACKGROUND ART

In a cordless extension phone system, in an event where a base unit or an extension unit is operated, display devices provided in the base unit and the extension unit are allowed to display a phone number and other party's information, and the cordless extension phone system is used so as to make a convenience of a dial operation and a call operation and to ensure the same. Moreover, in an event of receiving an incoming call, the cordless extension phone system is used so as to issue a notice on such incoming, and to display the other party's information.

Moreover, a system is known in public, which stores, in a base unit and a plurality of extension units, phone book data recording therein phone numbers and other party's information, both being used in the base unit and the extension units, and in an event where the base unit or the extension unit is operated, reads out the phone book data and displays the phone number and other party's information on a display device of the base unit or the extension unit (for example, refer to Patent Documents 1 and 2).

PRIOR ART DOCUMENTS

Patent Documents

Patent Document 1: Japanese Patent Laid-open Publication No. 2004-228730
Patent Document 2: Japanese Patent Laid-open Publication No. 2005-94431

SUMMARY OF THE INVENTION

Problems to be Solved by the Invention

The base unit in the system as described above includes the plurality of extension units, and the same display information is displayed on the base unit in a case where the same operation is performed in the respective extension units.

However, with regard to the base unit including the plurality of extension units, in a family, it is frequent that the extension units are used exclusively in a unit of an individual or in a unit of a small number of persons such that an extension unit 1 is for parents (or for a father and a mother), that an extension unit 2 is for children (or for a firstborn son and a firstborn daughter), and that an extension unit 3 is for grandparents. As described above, the extension units are used exclusively in the unit of the individual or in the unit of the small number of persons. Accordingly, if information corresponding to the unit of the individual or to the unit of the small number of persons is displayed on each of the extension units, and a display image can be operated therein, then the extension unit becomes convenient since more accurate information is displayed thereon and the extension unit can be operated, and an optimal user operation can be realized.

Moreover, in a similar way also in a company or an office, a cellular phone is owned and used by each individual, and accordingly, if image information corresponding to each individual is displayed on a display terminal by using the cellular phone, then such a display image can be used conveniently. Furthermore, if the display image can be operated, then the display image can be used efficiently.

Moreover, with regard to a recent communication terminal added with a wireless extension unit, there is also a product, which includes a display screen with a size of approximately 5 to 10 inches on the communication terminal, allows the display screen to display a calendar, a timepiece, a picture of a family, a picture of a pet, or a picture taken when the family makes a trip, and is used like a picture stand. If an individual's favorite picture can be displayed on this picture stand, and an individual's favorite operation is enabled, then a picture stand can be used with more fun.

In the company or the office, the display terminal can be used by allowing the same to display company information, product information, a product introduction, advertisement information, a schedule or the like, which a user of the cellular phone requires.

Moreover, for the purpose of restricting, for each user of the cellular phone, the display information to be displayed on the display screen, maintaining privacy in each cellular phone, and maintaining mutual security, desirably, information intrinsic to each cellular phone can be displayed individually on each cellular phone, and can be operated thereon.

The present invention has been made in consideration of such requirements. The present invention provides an information display system capable of displaying, on a display terminal, a display image related to a cellular phone, and capable of controlling the display image by an operation of the cellular phone, provides a communication terminal and a cellular phone, which are used in this information display system, and further, provides an information display method.

Solutions to the Problems

In order to solve the foregoing problems, an information display system of the present invention is an information display system, which includes a communication terminal that performs display and control for an image based on information from a plurality of cellular phones, characterized in that each of the cellular phones includes a specification information storage unit that stores specification information for specifying the cellular phone itself, an image information storage unit that stores image information, an operation information creation unit that creates operation information for operating a display image, and a transmission unit that transmits, to the communication terminal, a communication signal including the specification information, the image information and the operation information, and the communication terminal includes a reception unit that receives the communication signal from each of the cellular phones, a display information storage unit that stores, as display information, the image information included in the received communication signal, a display unit, and a display control unit that, when the reception unit has received the specification information, reads out display information of the cellular phone, the display information corresponding to the specification information, from the display information storage unit, and displays the display information as an image on the display unit, and when the reception unit has received the operation information, controls the display image displayed on the display unit based on the operation information.

Moreover, in order to solve the foregoing problems, from another viewpoint, the present invention is a communication terminal including: a reception unit that receives, from a cellular phone, a communication signal including specification information for specifying the cellular phone itself, display information, and operation information for operating a display image; a display information storage unit that stores the display information included in the received reception signal; a display unit; and a display control unit that, when the reception unit has received the specification information, reads out display information corresponding to the specification information from the display information storage unit, and displays the display information as an image on the display unit, and when the reception unit has received the operation information, controls the display image displayed on the display unit based on the operation information.

Furthermore, in order to solve the foregoing problems, from another viewpoint, the present invention is a cellular phone including: a specification information storage unit that stores specification information for specifying the cellular phone itself; an image information storage unit that stores image information; an operation information creation unit that creates operation information for operating a display image; and a transmission unit that transmits, to the communication terminal, a communication signal including the specification information, the image information and the operation information.

Moreover, in order to solve the foregoing problems, from another viewpoint, an information display method of the present invention is characterized in that, by using a cellular phone including a specification information storage unit that stores specification information for specifying the cellular phone itself, an image information storage unit that stores image information, an operation information creation unit that creates operation information for operating a display image, and a transmission unit that transmits, to a communication terminal, a communication signal including the specification information, the image information and the operation information, and by using the communication terminal including a reception unit that receives the communication signal, a display information storage unit that stores, as display information, the image signal included in the received communication signal, and a display unit, there are executed: a reception step of allowing the reception unit to receive the communication signal in the communication terminal; a step of, when the reception unit has received first specification information, reading out display information corresponding to a first specification signal from the display information storage unit, and displaying the display information as an image on the display unit; an operation information creation step of creating the operation information in the cellular phone when the image is displayed on the communication terminal; a transmission step of transmitting a communication signal including second specification information and the operation information from the transmission unit to the reception unit; and a display control step of controlling the image displayed on the display unit based on the operation information when the second specification information and the operation information are received by the reception unit, and the first specification signal and the second specification signal coincide with each other.

Effects of the Invention

In accordance with the present invention, the display information related to the plurality of cellular phones is displayed individually on the display terminal, and the control of the display image is performed by the operation of each cellular phone, and accordingly, convenience of the cellular phones is expanded. Moreover, the display terminal displays the display information related to the cellular phones, and accordingly, the display information is restricted for each cellular phone, the privacy of each cellular phone can be maintained, and the mutual security can be maintained.

BRIEF DESCRIPTION OF THE DRAWINGS

FIG. 1 shows configuration diagrams of an information display system of the present invention.

FIG. 2 shows a first using state explanatory diagram of the information display system of the present invention.

FIG. 3 shows a second using state explanatory diagrams of the information display system of the present invention.

FIG. 5 shows an owner data matrix for use in the information display system of the present invention.

FIG. 6 shows a display information data matrix for use in the information display system of the present invention.

FIG. 7 shows an operation information data matrix for use in the information display system of the present invention.

MODE FOR CARRYING OUT THE INVENTION

Figure 4:
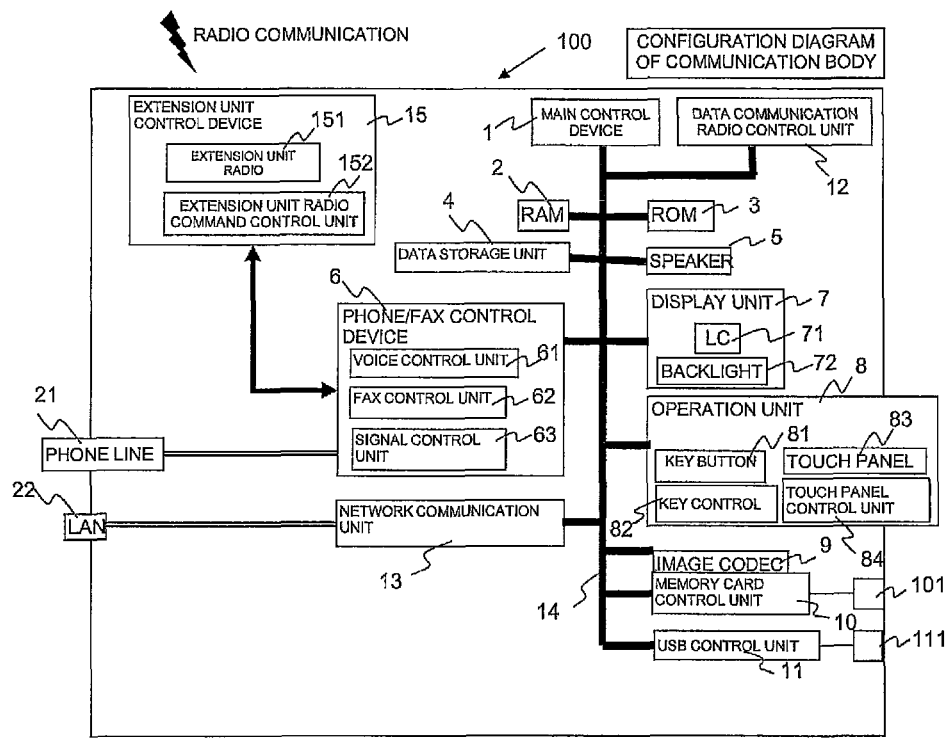
FIG. 4 shows a block diagram of a communication terminal that composes the information display system of the present invention.

An information display system of the present invention is an information display system, which includes a communication terminal that performs display and control for an image based on information from a plurality of cellular phones. Each of the cellular phones includes a specification information storage unit that stores specification information for specifying the cellular phone itself, an image information storage unit that stores image information, an operation information creation unit that creates operation information for operating a display image, and a transmission unit that transmits, to the communication terminal, a communication signal including the specification information, the image information and the operation information. The communication terminal includes a reception unit that receives the communication signal from each of the cellular phones, a display information storage unit that stores, as display information, the image information included in the received communication signal, a display unit, and a display control unit that, when the reception unit has received the specification information, reads out display information of the cellular phone, the display information corresponding to the specification information, from the display information storage unit, and displays the display information as an image on the display unit, and when the reception unit has received the operation information, controls the display image displayed on the display unit based on the operation information.

As each of the above-described cellular phones, it is possible to apply a cellular phone used in general, and each of the cellular phones to be used in the present invention particularly includes the specification information storage unit, the operation information creation unit, and the communication unit.

The above-described specification information storage unit stores the specification information for specifying the cellular phone itself, for example, identification information such as a cellular phone number, an owner name of the cellular phone, and ID information of the cellular phone. As such identification information, information originally stored in the cellular phone can be used.

The operation information creation unit includes an acceleration sensor and an angular velocity sensor, and creates right-and-left, back-and-forth and rotation information by right-and-left, back-and-forth and rotation operations detected by these sensors.

Moreover, the communication unit is a radio communication unit provided in advance in order to transmit/receive phone book data, image data, or other data with other cellular phones, and for example, performs the transmission/reception by a function of Bluetooth (registered trademark), IrDA, IrSS or IrSimple. By this communication unit, the cellular phone and the communication terminal directly communicate with each other without passing through a carrier base station of the cellular phone or a phone line thereof.

The above-described communication terminal includes the reception unit, the display information storage unit, the display unit, and the display control unit. Here, the reception unit receives the communication signal from the cellular phone, for example, by the function of Bluetooth (registered trademark), IrDA, IrSS or IrSimple.

The display information storage unit stores display information related to each of the cellular phones.

The display unit displays an image related to each of the cellular phones.

When the specification information for specifying the cellular phone is received by the reception unit, the display control unit reads out the display information related to the cellular phone concerned from the display information storage unit, and displays the display information on the display unit, and when the operation information is received thereby, the display control unit controls the image displayed on the display unit based on the operation information.

The information display system of the present invention can associate the display information stored in the display information storage unit with the cellular phone by an association operation from the cellular phone concerned.

Moreover, the information display system of the present invention stores, in the display information storage unit, display information for forming a plurality of images, and in response to an operation of the cellular phone, the display control unit performs turning-over display of changing display images from one display image to another display image or slide show display of continuously changing the display images.

Moreover, the information display system of the present invention includes the communication unit that allows direct radio communication between the cellular phone and the communication terminal, and the information display system allows direct communication therebetween without passing through a phone line or a relay station. Hence, the communication is short distance radio communication or line-of-sight communication, and the communication has a fast communication speed, and can be made without charge. Since the communication speed is fast, the display image can be operated as if being directly operated from the cellular phone.

Moreover, the information display system of the present invention stores the display information related to the cellular phone, reads out the display information associated with the cellular phone, and displays the display information on the display unit. Accordingly, when the cellular phone and the communication terminal communicate with each other, the display information associated with the cellular phone concerned is displayed. Hence, by the matter that the communication terminal communicates with the cellular phone, display information as a favorite of an owner of the cellular phone is displayed on the communication terminal. For example, such favorite information includes picture of a family, a picture of a pet or a picture of scenery, a schedule or information necessary for the owner. Then, when the cellular phone concerned is operated right and left, back and forth, up and down or rotationally, such an operation is detected by the sensor, and in accordance with information of the operation concerned, for example, there is performed the turning-over display of displaying the next picture or the slide show display in which the pictures are continuously changed.

A description is made below of the information display system of the present invention with reference to the drawings.

FIG. 1 shows configuration diagrams in a case where the present invention is applied to an information display system that uses a communication terminal and cellular phones.

As shown in FIG. 1(a), the information display system of the present invention is composed of: a communication terminal 100; and a plurality of cellular phones 201 to 03. The number of cellular phones may be arbitrary as long as the number is one or more. The communication terminal 100 of FIG. 1(a) is on a standby state, and displays one screen in a slide show on a display screen 101. The communication terminal 100 may display an icon for an operation, such as "phone book", "display picture" and "FAX", as well as displaying the slide show. The communication terminal for use in the information display system of the present invention is used as a communication terminal for phone/FAX, and accordingly, is usually in a state where a power supply is on, and the display screen 101 displays any of the slide show and the icon for the operation, such as "phone book" and "display picture".

Here, the communication terminal 100 includes a large display unit so that a display screen 101 with a size of approximately 5 to 10 inches can occupy a major part of a principal surface thereof. However, the communication terminal 100 does not have a mouthpiece (microphone). Therefore, in a vicinity of the communication terminal 100, one extension unit is arranged, and is used as an operation terminal. In this case, a base unit is composed of the communication terminal 100 and the one extension unit. In the following, a set of the communication terminal 100 and the one extension unit is sometimes referred to as a base unit. The number of extension units may be arbitrary as long as the number is one or more. The extension unit is connected to a phone line through a phone/FAX control device provided in the communication terminal 100, and moreover, is connected to a LAN through a network communication unit. Hence, through the communication terminal 100, the extension unit can make a phone call, can receive a phone call, can communicate with another extension unit, can transmit and receive a FAX, can connect to the LAN, and so on.

On the display unit 101, the communication terminal 100 is capable of displaying a picture, a calendar, a timepiece, a schedule or the like. Moreover, the picture, the calendar, the timepiece or the schedule may always be displayed on the communication terminal 100, or may be sequentially changed by every predetermined time like the slide show. Furthermore, in a case of using the information display system of the present invention in a company or an office, company information, product information, a product introduction, advertisement information, the schedule or the like may be displayed on the display screen 101.

Moreover, in a case where this communication terminal 100 is connected to the phone line, it is possible to transmit and receive the FAX; however, the communication terminal 100 does not include a scanner device or a printer device. Therefore, a transmitted image and a received image are inputted/outputted by a memory medium. Alternatively, an image is captured by a scanner device provided separately from the communication terminal 100, and an image is printed by a printer device provided separately from the communication terminal. Furthermore, the communication terminal 100 is connected to the phone line, and accordingly, is capable of receiving image information imaged by a camera of the cellular phone. Alternatively, the communication terminal 100 is also capable of outputting image information to the cellular phone.

Moreover, the communication terminal 100 is connected to the LAN, and is capable of communicating with a network. Accordingly, the communication terminal 100 is capable of using image information present in a homepage in the network, and of outputting image information to a homepage.

Each of the cellular phones 201, 202 and 203 shown in FIG. 1(a) at least includes dial buttons 211, a cross button 212, a display unit 213, a microphone 214, and a speaker 215. Moreover, the cellular phone includes, in an inside thereof, an angular velocity sensor, an acceleration sensor, and a direct radio communication unit that directly communicates with the communication terminal 100. For example, the direct radio communication unit is Bluetooth (registered trademark), IrDA, IrSS, IrSimple or the like, and is used for transmission/reception of image data, phone book data and other data.

As described above, when communication is made from each of the cellular phones 201 to 203 to the communication terminal 100 by such direct communication, display information associated with the cellular phone concerned is read out, and a display image is displayed on the display screen 101. Moreover, when each of the cellular phones 201 to 203 is operated, the display image is controlled based on an operation signal from each of the cellular phones 201 to 203.

Here, a description is made on the assumption that there are three cellular phones; however, the number of cellular phones just needs to be one or more. The same is also applied below.

FIG. 1(b) shows that display information associated with the cellular phone 201 is displayed on the display screen 101 of the communication terminal 100. The display screen 101 shown in FIG. 1(b) shows a state of displaying six pictures of a pet as a favorite of a mother who is an owner of the cellular phone 201.

In a similar way, FIG. 1(c) shows that display information associated with the cellular phone 202 is displayed on the display screen 101 of the communication terminal 100. The display screen 101 shown in FIG. 1(c) shows a state of displaying six pictures of friends of a daughter who is an owner of the cellular phone 202.

Moreover, FIG. 1(d) shows that display information associated with the cellular phone 203 is displayed on the display screen 101 of the communication terminal 100. The display screen 101 shown in FIG. 1(d) shows a state of displaying pictures of grandchildren of a grandfather who is an owner of the cellular phone 203.

Moreover, FIG. 2 shows a state where pictures displayed on the display screen 101 are changed like being turned over one by one when the cellular phone 201 is operated to swing right and left, back and forth, and so on. Then, when the cellular phone 201 is operated to swing up and down, information in another category, such as the timepiece, the calendar and the schedule, is displayed. When a speed of swinging the cellular phone 201 right and left, back and forth, or up and down is changed, a changing speed of the display information is changed.

Moreover, FIG. 3(a) shows that the slide show is being carried out by using the display information stored in a data storage unit of the communication terminal 100. Then, as shown in FIG. 3(b), for example, when the cellular phone 201 is shaken like drawing a circle, the display information associated with the cellular phone 201 is read out, and the slide show is carried out. FIG. 3(b) shows a slide show where the pictures of the pet as the favorite of the mother are changed like being turned over one by one. Then, when a direction of drawing the circle is changed, the slide show is displayed so that the pictures can be changed reversely. Moreover, when a speed of shaking the cellular phone is changed, a changing speed in the slide show is changed.

As described above, each of the cellular phones is associated with the individual display information by specification information, the display unit can be allowed to display the display information intrinsic to the cellular phone, and the display image can be controlled by operating the cellular phone. As a matter of course, the display image intrinsic to the cellular phone is displayed only when the communication between the cellular phone concerned and the display terminal is established, and the image concerned cannot be displayed even if the communication between other cellular phone and the display terminal is established. In such a way, the display information usable in each of the cellular phones can be restricted. Therefore, privacy of each of the cellular phones can be maintained, and a mutual secret can be maintained.

Here, a description is made of the case where the intrinsic display information associated with the cellular phone is displayed when the communication between the cellular phone concerned and the display terminal is established. However, the cellular phone has an off-hook button and operation buttons, and accordingly, the display information can be displayed by signals to be outputted when these buttons are operated, and relationships between these signals and the display information are stored, whereby information can be displayed based on such relationships between button operations of the cellular phone and the display information.

<Configuration of Communication Terminal>

FIG. 4 shows a block diagram of the communication terminal 100 in a case where the information display system of the present invention is applied to a communication terminal added with a wireless extension unit.

The communication terminal 100 includes: a main control device 1, for example, such as a CPU; a RAM 2 to be used as a working memory; a ROM 3; a data storage unit 4 that stores relationships among each of the cellular phones, the display information and operation information; a speaker 5; a phone/FAX control device 6; a display unit 7; an operation unit 8; an image codec 9; a memory card control unit 10; a USB control unit 11; a data communication radio control unit 12; and a network communication unit 13, and these respective units are mutually communicable with one another by a bus 14. Moreover, the phone/FAX control device 6 is connected to an extension unit control device 15.

With reference to FIG. 1, the description has been made on the assumption that the communication terminal 100 does not include the microphone and the operation unit. These are not essential requirements of the present invention, and the communication terminal 100 may be used as the base unit by including these in the communication terminal 100 concerned, or the communication terminal 100 and one wireless extension unit may be made as a set and used as the base unit.

The above-described main control device 1 reads out a program stored in the ROM 3, and controls the communication terminal 100 and the wireless extension units to operate in accordance with an initial object. Moreover, the main control device 1 controls the communication with the cellular phones and the wireless extension units.

The RAM 2 is a working memory that temporarily stores data, information and the like in a case where the above-described main control device 1 executes a predetermined operation. For example, the RAM 2 is used as a search unit that searches the relationship between each of the cellular phones and the display information by taking, as a keyword, a cellular phone number received from the cellular phone concerned, and is used as a display control unit that allows display of the display information based on a search result. Moreover, the RAM 2 is used as a search unit that searches a relationship between each of the cellular phones and operation information, which is received from the cellular phone, based on the operation information, and is used as a display control unit that controls the display information based on a search result.

The ROM 3 stores program data for operating the information display system of the present invention in accordance with the initial object, and fixed data necessary for this information display system.

The data storage unit 4 stores the relationships among each of the cellular phones, the display information and the operation information as data matrices shown in FIG. 5 to FIG. 7.

Specifically, an owner data matrix shown in FIG. 5 stores, for example, relationships between owner name information of the cellular phones and numbers of the cellular phones. Specifically, the owner data matrix indicates that, for Yamada Taro, the number of the cellular phone is "none", for Sato Jiro, the number of the cellular phone is "201", and for Tanaka Shiro, the number of the cellular phone is "202" and "203". Besides the above, the owner data matrix may store image information of the owners of the cellular phones, and setting numbers of the cellular phones, and does not have to store all thereof. In FIG. 5, the owner data matrix stores personal names on the assumption that individuals own the cellular phones; however, may store nicknames and group names. Tanaka Shiro shown in FIG. 5 is indicated to be capable of using the extension units 202 and 203. Moreover, for Yamada Taro, no number of the cellular phone is designated, and Yamada Taro is indicated to be capable of using any extension unit.

A display information data matrix shown in FIG. 6 shows relationships between the display images and recognition information of the cellular phones. As shown in FIG. 6, an image file name yama.jpg of a file number 1 stores a company name (S company), a model name (TTT) and a cellular phone number (123456) as the recognition information of the cellular phone. An image file name sato.jpg of a file number 2 stores a company name (M company), a model name (AAA) and a cellular phone number (234567) as the recognition information of the cellular phone. Moreover, an image file name t4rou.jpg of a file number 3 stores a company name (undefined), a model name (undefined) and a cellular phone number (undefined) as the recognition information of the cellular phone.

An operation data matrix shown in FIG. 7 stores associations between actions of the display images and the operations of the cellular phones 201 to 203. As the operations of the cellular phones, there are a right-and-left operation, an up-and-down operation, a counterclockwise rotation operation, and a clockwise rotation operation. As the actions of the display images, there are turning over of one display image, and displays of the slide show, the reverse slide show, the schedule, the calendar and the timepiece. The associations between the operations of the cellular phones and the actions of the display images shown in FIG. 7, are merely an example, and it is possible to arbitrarily associate both of them with each other. Moreover, in a case where the same associations are made among all of the cellular phones, the cellular phones just need to have a common operation information data matrix.

The data matrices of FIG. 5 to FIG. 7 are explicitly shown, and do not show a storage state of the data storage unit 4. Moreover, the data matrices of FIG. 5 to FIG. 7 are merely an example, and are arbitrarily settable. Moreover, information or an operation, which is other than in FIG. 5 to FIG. 7, may be set.

Moreover, the data storage unit 4 stores the pictures shown in FIG. 1, FIG. 2 and FIG. 3, a moving picture, a still image, the phone book data, and the like, to which image names, titles, storage times of day, a person who performs the storage, or the like is individually assigned. Moreover, the data storage unit 4 may store the company information, the product information, the product introduction, the advertisement information, the schedule or the like in order to use the same in the company or the office.

The phone/FAX control device 6 is a portion, which is connected to a phone line 21, and controls phone or FAX communication. The phone/FAX control device 6 is also capable of connecting to the cellular phones through the phone line 21.

A voice control unit 61 controls a voice signal between the phone line 21 and each of the wireless extension units.

A FAX control unit 62 controls reception of an image signal from the phone line 21, or output of an image signal to the phone line 21.

In this embodiment, the communication terminal 100 does not include a scanner or a printer device; however, can transmit, as a FAX signal, an image signal inputted from a memory card or a storage medium to be connected to a USB, or the display information stored in the data storage unit 4. Moreover, in a case of having received a FAX signal, the communication terminal 100 can store the FAX signal in the RAM 2, and can allow the display unit to display the FAX signal in response to a request of a user. And, if necessary, the communication terminal 100 is capable of recording the FAX signal in the memory card or the storage medium to be connected to the USB.

A signal control unit 63 is a line interface unit (LIU) that controls such a signal received from the phone line 21 or such a signal to be transmitted from the communication terminal 100. For example, in a case of having detected an incoming signal, the signal control unit 63 allows the communication terminal 100 to display such incoming and to output a ring tone. Moreover, in an event of sending out a dial sending signal, the signal control unit 63 outputs a call origination signal, and transmits a dial signal to the phone line 21. Furthermore, in a case of having received a keying signal from the phone line 21, the signal control unit 63 opens/closes a phone circuit in the communication terminal 100. Besides, the signal control unit 63 detects whether or not the phone and the FAX collide against each other and the incoming and the call origination collide against each other.

The display unit 7 includes an LCD, that is, a liquid crystal display device 71 and a backlight 72. The liquid crystal display device 71 has a size of approximately 5 inches to 10 inches, and includes the display screen 101 (FIG. 1) with such a size that enables display of a so-called portrait. It is not necessary that the size of the liquid crystal display device 71 be limited to 5 inches to 10 inches, and the size may be equal to or larger than 5 inches to 10 inches, or may be equal to or smaller than 5 inches to 10 inches. The backlight 72 turns on when the operation unit 8 of the communication terminal 100 is operated, and an image display state is brought about by the liquid crystal display device 71. Moreover, when a phone or a FAX is received, the display unit 7 displays a reception state. Besides the above, the display unit 7 includes an LED, displays that the wireless extension unit is engaged when the LED turns on, and displays that the wireless extension unit is not engaged when the LED does not turn on.

The operation unit 8 includes: key buttons 81 such as totally twelve dial buttons which are number buttons of 0 to 9 and * and # buttons, an outside line button for outside line calling, a registration button for abbreviated dial registration, an abbreviation button for abbreviated dial calling, a redial button for dialing again a phone number dialed previously, and a cross button; and a key control unit 82. The key buttons 81 enable an operation of the communication terminal 100. Moreover, a touch panel 83 is arranged on a front surface of the liquid crystal display device 71, and in a case where such an operation is performed by using the touch panel 83, then an operation position is detected by a touch panel control unit 84, an operation signal corresponding to the operation position is created, and the operation of the communication terminal 100 is enabled.

The image codec processing unit 9 is software that performs compression/extension for an image signal, and is used for image compression/extension of Group 3 and Group 4 facsimiles. Though not shown, the image codec processing unit 9 may include a voice codec such as G.711 codec for voice communication in ISDN in order to encode/decode a voice signal.

When a memory card reader is connected to a memory card connection portion 101 provided in the communication terminal 100, and a memory card is inserted into the memory card reader, the memory card control unit 10 detects the memory card, captures information recorded in the memory card, and performs signal processing therefor. Alternatively, into the memory card, the memory card control unit 10 writes the data stored in the RAM 2 or data storage unit 4 of the communication terminal 100, or the information received by the phone line 21.

When a USB is connected to a USB connection portion 111 provided in the communication terminal 100, then the USB control unit 11 detects the USB, captures information from an instrument to be connected to the USB, for example, from an external hard disk, a DVD, or a CD, performs signal processing therefor. Alternatively, the USB control unit 11 sends the data stored in the RAM 2 or data storage unit 4 of the communication terminal 100 or the information received from the phone line 22 to the instrument to be connected to the USB connection portion 111.

The data communication radio control unit 12 is a control unit that enables the direct radio communication between the communication terminal 100 and the cellular phone 201 202 or 203. The direct radio communication is radio communication directly made without passing through a phone line or a relay station, and is short distance radio communication or line-of-sight communication. The direct communication has a fast communication speed, and can make communication without charge. Since the communication speed is fast, the display image can be operated as if being directly operated from the cellular phone. For the data communication, for example, Bluetooth (registered trademark), IrDA, IrSS or IrSimple is used, and the transmission/reception of the image data, the phone book data or the other data is performed. In the present invention, the direct communication is used for transmission/reception of the display information and the operation information from the cellular phone.

The network communication unit 13 includes RJ-45 and a wired LAN communication function or a wireless LAN communication function such as WiFi, and by a LAN 22, communicates with an internal network or an external network, and acquires or outputs image information or music information.

The extension unit control device 15 includes an extension unit radio communication unit 151 and an extension unit radio command control unit 152.

The extension unit radio communication unit 151 controls the radio communication between the communication terminal 100 and the wireless extension unit. Two or more of the wireless extension units may be provided according to needs.

The extension unit radio command control unit 152 performs transmission/reception of data with the phone/FAX control device 6, analyzes a communication signal with the wireless extension unit, and detects which of the wireless extension units shifts to a cradle-up or a communication line acquisition state (that is, off-hook). Moreover, the extension unit radio command control unit 152 detects an operation command transmitted from the wireless extension unit.

<Configuration of Cellular Phone>

Figure 8:
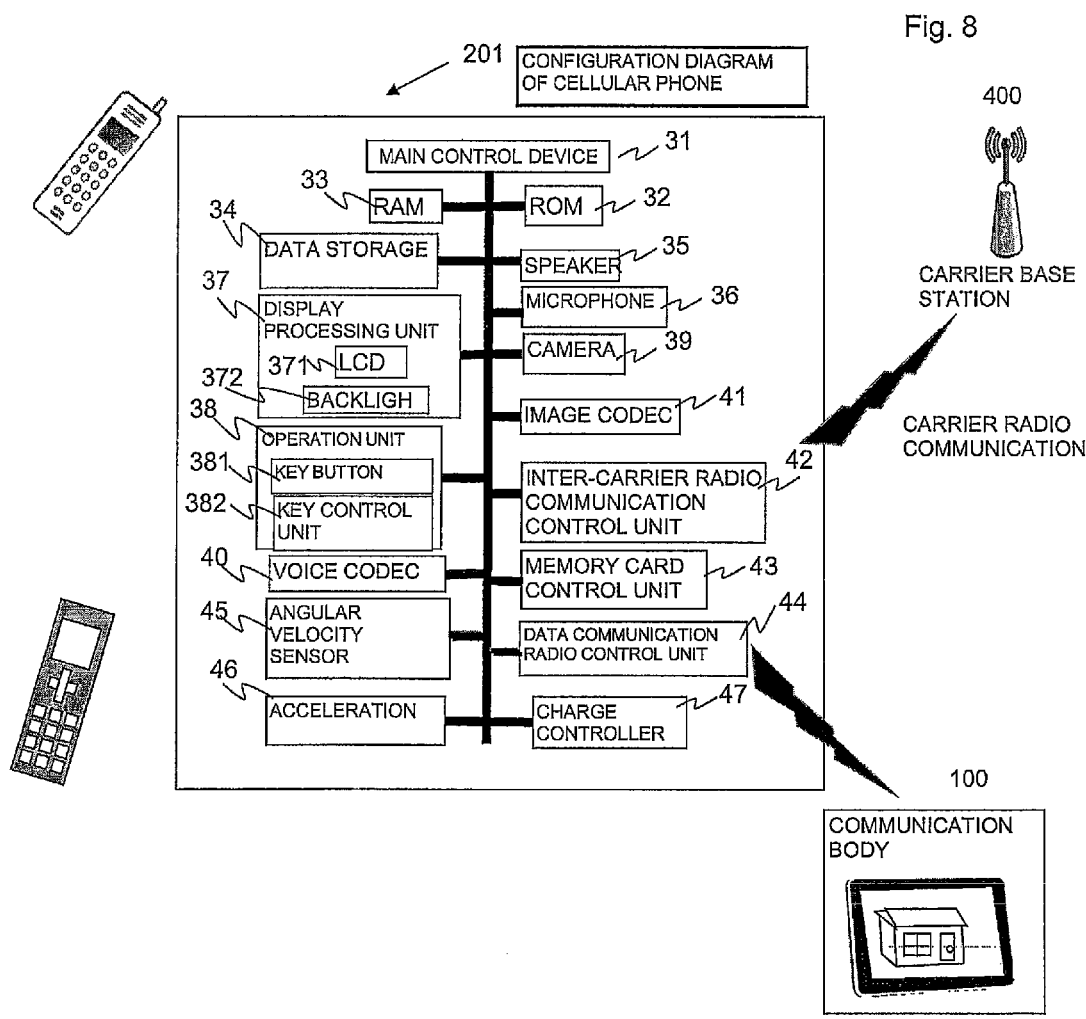
FIG. 8 shows a block diagram of a cellular phone that composes the information display system of the present invention.

FIG. 8 shows a block diagram of the cellular phone 201. Note that each of the cellular phones 202 and 203 includes a configuration in FIG. 8.

The cellular phone 201 includes: a main control device 31 that controls the cellular phone, a ROM 32, a RAM 33, a data storage unit 34, a speaker 35, a microphone 36, a display unit 37, an operation unit 38, a camera 39, a voice codec 40, an image codec 41, an inter-carrier radio communication control unit 42, a memory card control unit 43, a data communication radio control unit 44, an angular velocity sensor 45, an acceleration sensor 46, and a charge control unit 47.

The main control device 31 is a control unit, which reads out a program stored in the ROM 32, and controls the cellular phone 201 to operate in accordance with an initial object. For example, the main control device 31 is composed of a CPU.

The ROM 32 stores program data for operating the cellular phone 201 in accordance with the initial object and fixed data necessary for this cellular phone.

The RAM 33 is a working memory that temporarily stores data, information and the like in a case where the main control device 31 executes a predetermined operation.

The data storage unit 34 stores identification information of the cellular phone 201. The identification information is information such as a cellular phone number, an owner name of the cellular phone, and ID information of the cellular phone. Moreover, the data storage unit 34 stores the phone book data, transmitted mail, and received mail. Besides these, the data storage unit 34 stores an image imaged by the camera. This imaged image is transmitted to the communication terminal 100, and on the display unit thereof, is displayed as a display image associated with the cellular phone.

The speaker 35 is a receiver, and the microphone 36 is a transmitter.

The display control unit 37 controls display of a liquid crystal display device 371 and a backlight 372.

The operation unit 38 includes: key buttons 381 such as totally twelve dial buttons which are number of 0 to 9 and * and # buttons, an off-hook button, a registration button for abbreviated dial registration, an abbreviation button for abbreviated dial calling, a redial button for dialing again a phone number dialed previously, and a cross button; and a key control unit 382. These key buttons 381 enable an operation of the cellular phone 201.

The camera 39 is provided for the purpose of imaging an image.

The voice codec 40 is software that performs encoding/decoding of a voice signal for the purpose of a voice codec such as G.711 codec for voice communication in ISDN.

The image codec 41 is software that performs compression/extension of an image signal.

The inter-carrier radio communication control unit 42 is a control unit for allowing the cellular phone 201 to make radio communication with a cellular phone base station 400. The inter-carrier radio communication control unit 42 transmits/receives cellular phone number information, voice data, mail information and image data.

When a memory card is inserted into a memory card connection portion provided in the cellular phone 201, the memory card control unit 43 detects the memory card, captures information recorded in the memory card, and performs signal processing therefor. Alternatively, into the memory card, the memory card control unit 43 writes the data stored in the RAM 33 or data storage unit 34 of the cellular phone 201.

The data communication radio control unit 44 is a portion that controls data communication. The data communication unit 44 is provided, for example, for allowing the cellular phones to mutually perform the transmission/reception of the image data, the phone book data or other data by the function of Bluetooth (registered trademark), IrDA, IrSS or IrSimple. The present invention directly communicates with the communication terminal 100 by using the data communication radio control unit 44. For example, the data communication radio control unit 44 transmits/receives the image data, the phone book data, or the other data, and transmits operation information for the cellular phone.

The angular velocity sensor 45 detects a rotation direction and rotation speed of the cellular phone 201, and by the data communication radio control unit 44, transmits angular velocity information to the communication terminal 100. With regard to the rotation direction, the angular velocity sensor 45 detects a clockwise rotation or a counterclockwise rotation. Moreover, with regard to the rotation speed, the angular velocity sensor 45 detects a velocity per second. However, the rotation direction and the rotation speed are not essential, and the angular velocity sensor 45 just needs to only output a signal indicating whether or not to detect the rotation.

The acceleration sensor 46 detects a swing of the cellular phone 201 in a right-and-left direction, a back-and-forth direction or an up-and-down direction. Moreover, the acceleration sensor 46 detects a swing of the cellular phone 201 in a diagonal direction. However, it is not essential that all of these directions be classified and detected, and the matter that the cellular phone 201 swings in any one of the directions may be detected. Furthermore, the acceleration sensor 46 may detect a moving speed of the cellular phone 201.

The charge control unit 47 is a portion, which prevents an overcharge of a secondary battery (not shown) of the cellular phone 201, and controls a charge thereof.

<Action of Information Display System>

The information display system of the present invention is configured as in FIG. 4 to FIG. 8, and is used as in FIG. 1 to FIG. 3. A description is made below of actions of the information display system of the present invention together with flowchart diagrams shown in FIG. 9 to FIG. 13.

Note that, in a case where the communication terminal 100 is used as an extension phone, the communication terminal 100 can perform transmission/reception of the phone and the FAX by the base unit, transmission/reception of the phone by the wireless extension unit, a call between the base unit and the extension unit, and a call between the extension units.

Moreover, the cellular phone is capable of a call with the communication terminal or other cellular phone, transmission/reception of mail, connection to a network, storage of the image imaged by the camera, and transmission of the image information to the communication terminal. However, these functions are not included in the spirit of the present invention, and accordingly, a description thereof is omitted here, and a description is made of the information display and operation, which are associated with the cellular phone, and are the spirit of the present invention.

Figure 9:
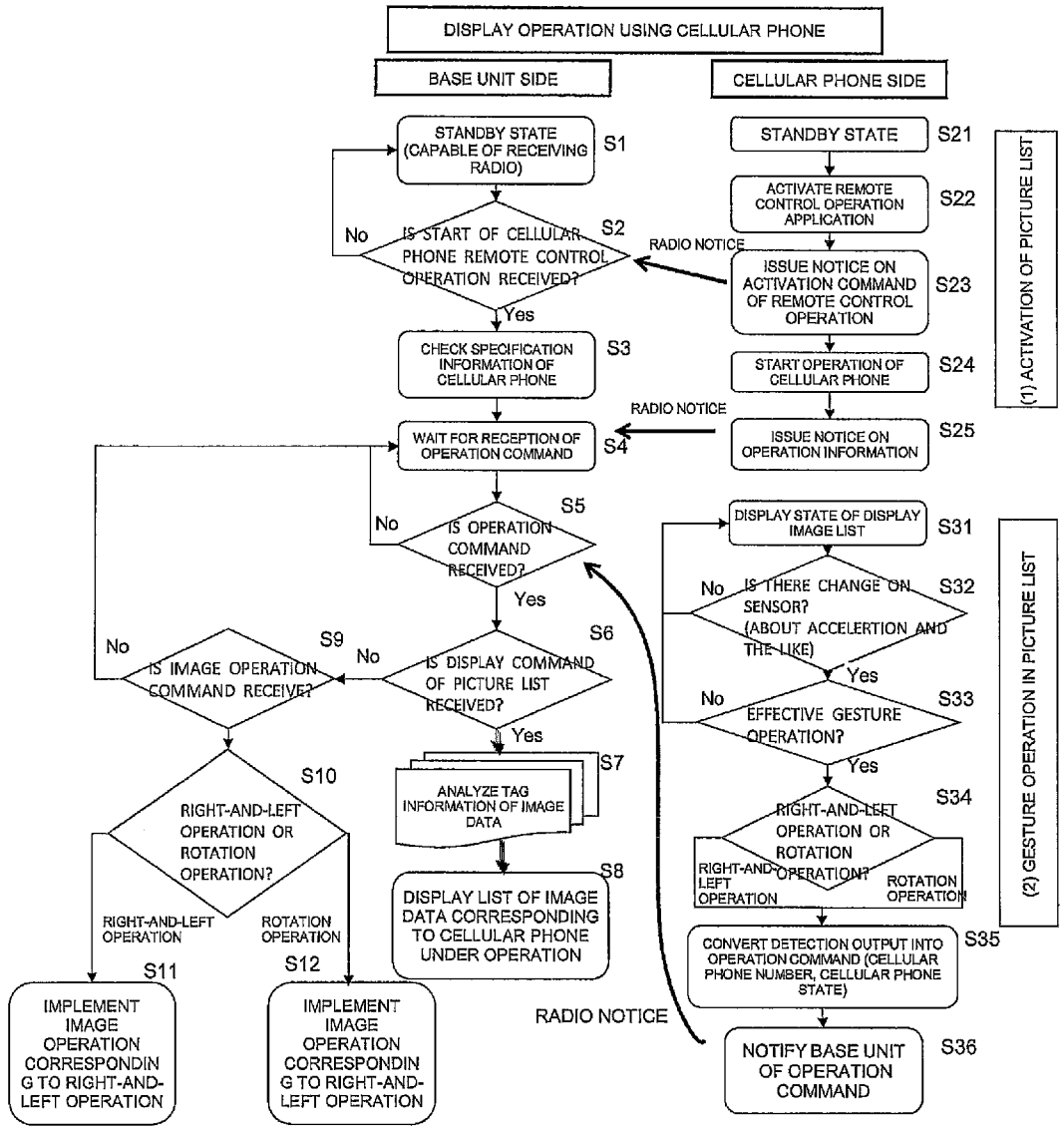
FIG. 9 shows a flowchart of the information display system of the present invention.

First, with reference to a flowchart of FIG. 9, a description is made of an operation of controlling the display by using the cellular phone.

The communication terminal 100 operates as in a flowchart shown on a left side (base unit side) of FIG. 9. A right side (cellular phone side) of FIG. 9 shows a flowchart for the cellular phone.

In Step S1, the communication terminal 100 is in a standby state. The communication terminal 100 is in a standby state for reception of the direct radio communication from each of the cellular phones 201 to 203. In the standby state, the communication terminal 100 displays one screen in the slide show as shown in FIG. 3(a), for example, by using the display information stored in the data storage unit 4. Besides such display shown in FIG. 3(a), the communication terminal 100 may display the icon for the operation, such as "phone book", "display picture" and "FAX". In Step S2, the communication terminal 100 determines whether or not to have received a remote control operation start signal by each of the cellular phones 201 to 203. If the communication terminal 100 has not received the remote control operation start signal from each of the cellular phones 201 to 203, then the routine returns to Step S1. In a case of having received the remote control operation start signal from the cellular phone 201, the routine shifts to Step S3, where specification information of the cellular phone 201, which is included in the remote control operation start signal, is checked. The specification information is information such as a cellular phone number, an owner name of the cellular phone, and ID information of the cellular phone. This check is performed by using the owner data matrix of FIG. 5. Next, in Step S4, the communication terminal 100 is in a standby state for reception of an operation command from the cellular phone 201.

Then, in Step S5, the communication terminal 100 determines whether or not to have received the operation command. If Yes, the routine proceeds to Step S6, where the communication terminal 100 determines whether or not the received operation command is a picture list display command. If Yes, the routine proceeds to Step S7, where tag information of the image data is analyzed. Specifically, the communication terminal 100 analyzes tag information of the image data file itself. For example, the communication terminal 100 puts the tag information into Exif information of a digital camera. In the next Step S8, the communication terminal 100 reads out the display information related to the cellular phone 201 under operation, and displays a list of the display images on the display unit 7.

By processing of the above-described Steps S1 to S8, only the display information of the owner registered in the owner data matrix shown in FIG. 5 is selected, and is displayed on the display unit 7.

Note that the communication terminal 100 analyzes the tag information of the image data in Step S7; however, may search the display information data matrix shown in FIG. 6 and read out the display information by taking, as a keyword, the specification information of the cellular phone, which is checked in Step S3.

In a case of No in the above-described Step S6, the routine shifts to Step S9, where the communication terminal 100 determines whether or not to have received an image operation command. If the communication terminal 100 has not received the image operation command, the routine returns to Step S4. However, if the communication terminal 100 has received the image operation command, the routine shifts to Step S10, where the communication terminal 100 determines whether the image operation command concerned is the right-and-left operation of the cellular phone or the rotation operation thereof. If the image operation command is the right-and-left operation of the cellular phone, the routine proceeds to Step S11, where the communication terminal 100 implements an operation for the display image, which is set in the right-and-left operation of the cellular phone 201, for example, the turning over of each one display image in accordance with the operation data matrix of FIG. 7. A speed of the turning over of each one display image is made to correspond to a speed of the right-and-left operation.

In a case where, in the above-described Step S10, it is determined that the image operation command is the rotation operation of the cellular phone 201, the routine proceeds to Step S12, where the communication terminal 100 implements an operation for the display image, which corresponds to the rotation operation, for example, the slide show in accordance with the operation data matrix of FIG. 7. An image changing speed of the slide show at this time is made to correspond to a speed of the rotation operation.

Display images to be displayed in Steps S11 and S12 are the display image displayed in the standby state of Step S1. Specifically, by using the display information stored in the data storage unit 4, the communication terminal 100 displays one screen in the slide show as shown in FIG. 1(a), or the icon for the operation, such as "phone book", "display picture" and "FAX". These display images are display images which have no relationship with the cellular phone under operation.

In contrast with the operations of the communication terminal 100, which are as described above, the cellular phone 201 operates as in a flowchart shown on a right side (cellular phone side) of FIG. 9. In Step S21, the cellular phone 201 is in a standby state. Specifically, the cellular phone is in an on-hook state. Next, in Step S22, the cellular phone is subjected to off-hook, and is operated to perform remote control, and accordingly, a remote control operation application is activated. Such a remote control operation of the cellular phone 201 is performed, for example, by simultaneously pushing the # button and number 1 button of the cellular phone 201. In the next Step S23, the cellular phone 201 issues a notice on an activation command of the remote control operation application to the communication terminal 100. The notice from the cellular phone 201 to the communication terminal 100 at this time is directly transmitted to the communication terminal 100 by the data communication radio control unit 44, for example, by using the function of Bluetooth (registered trademark), IrDA, IrSS or IrSimple. This activation command is received by the communication terminal 100 in Step S2. Then, in Step S24, the operation of the cellular phone 201 for the communication terminal 100 is started, and in Step S25, the communication terminal 100 is directly notified of the operation information by the radio communication. This notice of the operation information is received by the communication terminal 100 at a time of Step S4.

In Step S31, the cellular phone 201 is in a state of operating the list display of the display images, which is displayed on the display unit 7 of the communication terminal 100. Specifically, the display unit 7 of the communication terminal 100 is in a state of displaying the list of the display information in Step S8, and in Step S31, the cellular phone 201 is in a state of operating the list display of the display information. In the next Step S32, the cellular phone 201 determines whether or not the cellular phone 201 is operated right and left, back and forth, up and down or rotationally, and a detection output is obtained from the angular velocity sensor 45 or the acceleration sensor 46. In a case where the cellular phone 201 is not operated, the detection output is not obtained from the angular velocity sensor 45 or the acceleration sensor 46, and accordingly, the routine returns to Step S31.

In a case where the detection output is obtained from the angular velocity sensor 45 or the acceleration sensor 46, then in Step S33, it is determined whether or not the detection output concerned is a detection output of an effective gesture operation. If No, the routine returns to Step S31. If Yes, the routine proceeds to Step S34, where it is determined whether the detection output is an output by the right-and-left, back-and-forth or up-and-down operation or by the rotation operation.

Next, in Step S35, the detection output from the angular velocity sensor 45 or the acceleration sensor 46 is converted into an operation command. To the operation command, there are added the specification information of the cellular phone 201, and state information of the cellular phone. In Step S36, this operation command is transmitted to the communication terminal 100 by direct communication. This operation command is received by the communication terminal 100 in Step S5.

In a case where an operation speed is detected by the angular velocity sensor 45 or the acceleration sensor 46, or the right-and-left direction, the back-and-forth direction or the up-and-down direction or the clockwise direction or the counterclockwise direction is detected thereby, these pieces of information are included in the operation command, and the operation command is transmitted to the communication terminal 100.

<Slide Show Operation Using Cellular Phone>

Figure 10:
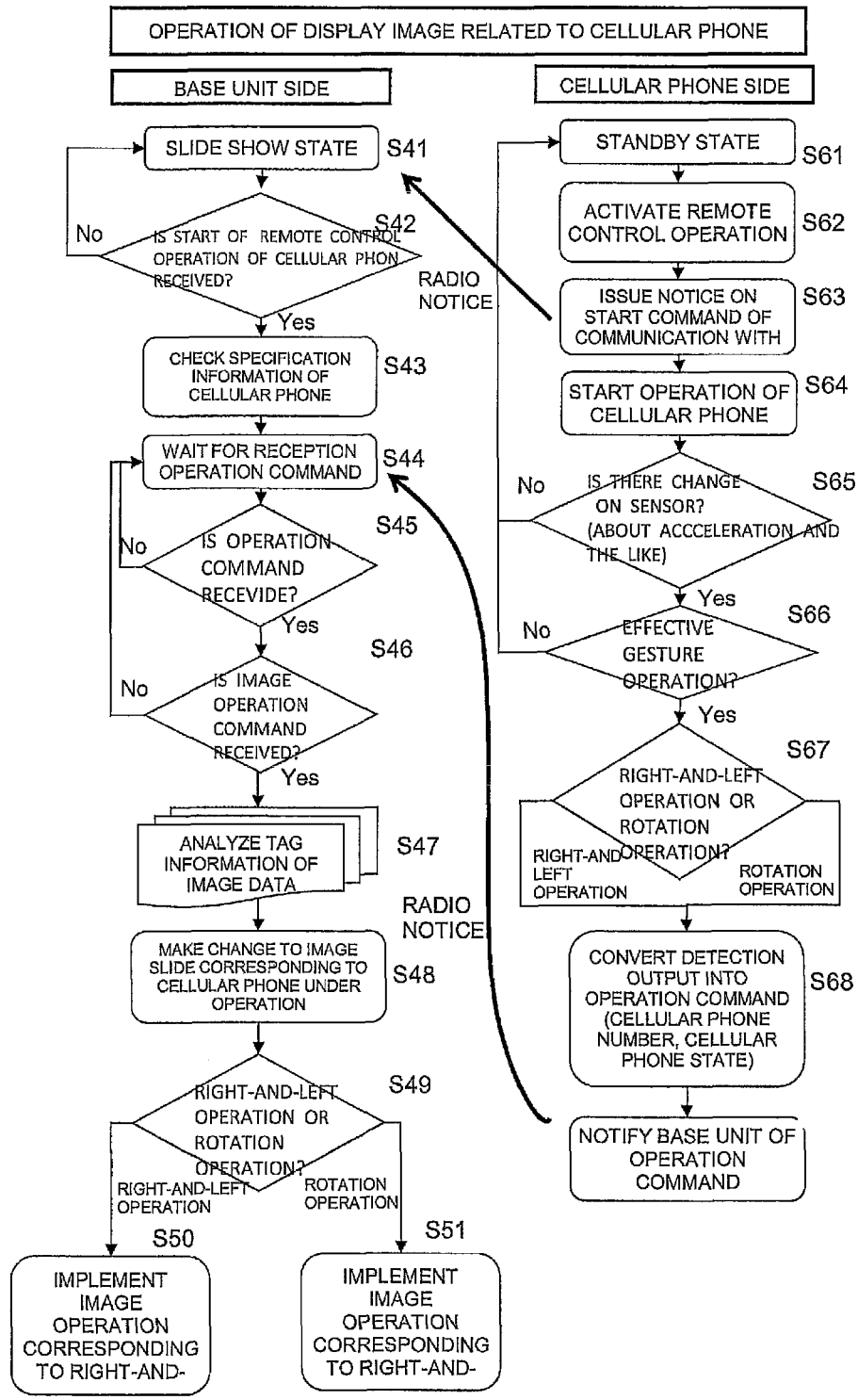
FIG. 10 shows a flowchart of a slide show operation using the cellular phone in the information display system of the present invention.

Next, with reference to a flowchart of FIG. 10, a description is made of the operation for the display image, which is related to the cellular phone 201.

The communication terminal 100 operates as in a flowchart shown on a left side (base unit side) of FIG. 10.

In Step S41, the communication terminal 100 is in a state of implementing the slide show by using the display information stored in the data storage unit 4. Next, in Step S42, the communication terminal 100 determines whether or not to have received a remote control operation start signal from the cellular phone 201. If No, the routine returns to Step S41. If Yes, the routine shifts to Step S43, where the communication terminal 100 checks the specification information of the cellular phone 201. As mentioned above, the specification information of the cellular phone 201 is the information such as a cellular phone number, an owner name of the cellular phone, and ID information of the cellular phone.

Next, in Step S44, the communication terminal 100 turns to a standby state for reception of an operation command from the cellular phone. In Step S45, the communication terminal 100 determines whether or not to have received the operation command from the cellular phone 201. If No, the routine returns to Step S44. If Yes, the routine proceeds to Step S46, where the communication terminal 100 determines whether or not the operation command received in Step S45 is the image operation command. If No, the routine returns to Step S44. If Yes, the routine proceeds to Step S47, where the communication terminal 100 analyzes the tag information of the image data. Alternatively, the communication terminal 100 searches the display information data matrix shown in FIG. 6 and reads out the display information by taking, as a keyword, the specification information of the cellular phone 201, which is checked in Step S43.

In the next Step S48, on the display unit 7, the communication terminal 100 displays, as a display image, the display information related to the cellular phone 201 under operation, which is read out in Step S47. Next, the routine shifts to Step S49, where the communication terminal 100 determines whether the operation command concerned is the right-and-left operation or the rotation operation. If the operation command is the right-and-left operation, then the routine proceeds to Step S50, where the communication terminal 100 implements an operation of the display image, which is set in the right-and-left operation, for example, the turning over of one display image in accordance with the operation information data matrix of FIG. 7. A speed of the turning over of one display image is made to correspond to a speed of the right-and-left operation. In a case where it is determined that the operation command is the rotation operation in the above-described Step S49, the routine proceeds to Step S51, where the communication terminal 100 implements an operation of the display information, which is set in the rotation operation, for example, the slide show in accordance with the operation information data matrix of FIG. 7. An image changing speed of the slide show at this time is made to correspond to a speed of the rotation operation. Display information of Steps S50 and S51 is the display information read out in Step S47, and is the display information related to the cellular phone 201 under operation.

In contrast with the slide show operations of the communication terminal 100, which are as described above, the cellular phone 201 operates as in a flowchart shown on a right side (cellular phone side) of FIG. 10. In Step S61, the cellular phone 201 is in a standby state. Next, in Step S62, the cellular phone 201 activates the remote control operation application. The remote control operation application is activated by pushing both of the # button and number 1 button of the cellular phone 201. In Step S63, the cellular phone 201 issues a notice, which tells that the remote control operation application thereof is activated, to the communication terminal 100 by radio communication. This notice is received by the communication terminal 100 in Step S41. As mentioned above, the notice from the cellular phone 201 to the communication terminal 100 by the radio communication is directly transmitted to the communication terminal 100 by the data communication radio control unit 44, for example, by using the function of Bluetooth (registered trademark), IrDA, IrSS or IrSimple.

Next, in Step S64, in order to operate the display image displayed on the display unit 7 of the communication terminal 100 by using the cellular phone 201, the right-and-left, up-and-down, back-and-forth or rotation operation of the cellular phone is started. In the next Step S65, the cellular phone 201 determines whether or not a detection output is obtained from the angular velocity sensor 45 or the acceleration sensor 46 as a result that the cellular phone is operated right and left, back and forth, up and down or rotationally. In a case where the detection output is not outputted from the angular velocity sensor 45 or the acceleration sensor 46, the routine returns to Step S61.

In a case where the detection output is obtained from the acceleration sensor 46 or the angular velocity sensor 45, then in Step S66, the cellular phone 201 determines whether or not the detection output concerned is a detection output of an effective gesture operation. If No, the routine returns to Step S61. If Yes, then in Step S67, the cellular phone 201 determines that the detection output is an output by the right-and-left, back-and-forth or up-and-down operation or by the rotation operation.

Next, in Step S68, the detection output from the acceleration sensor 46 or the angular velocity sensor 45 is converted into an operation command including the specification information of the cellular phone 201 and the state information of the cellular phone 201. Here, the state information of the cellular phone 201 stands for such a state that the cellular phone 201 is now under calling, imaging by the camera, and call in coming. Then, in Step S69, the operation command is transmitted to the communication terminal 100 by direct communication. This operation command is received by the communication terminal 100 in Step S44.

In a case where the operation speed is detected by the angular velocity sensor 45 or the acceleration sensor 46, information of the operation speed is included in the operation information. Moreover, in a case where the right-and-left direction, the back-and-forth direction or the up-and-down direction or the clockwise direction or the counterclockwise direction is detected by the angular velocity sensor 45 or the acceleration sensor 46, these pieces of information are included in the operation command, and the operation command is transmitted to the communication terminal 100.

<Operations of Registering Display Information in Association with Cellular Phone (Display Information Data Matrix is Updated)>

Figure 11:
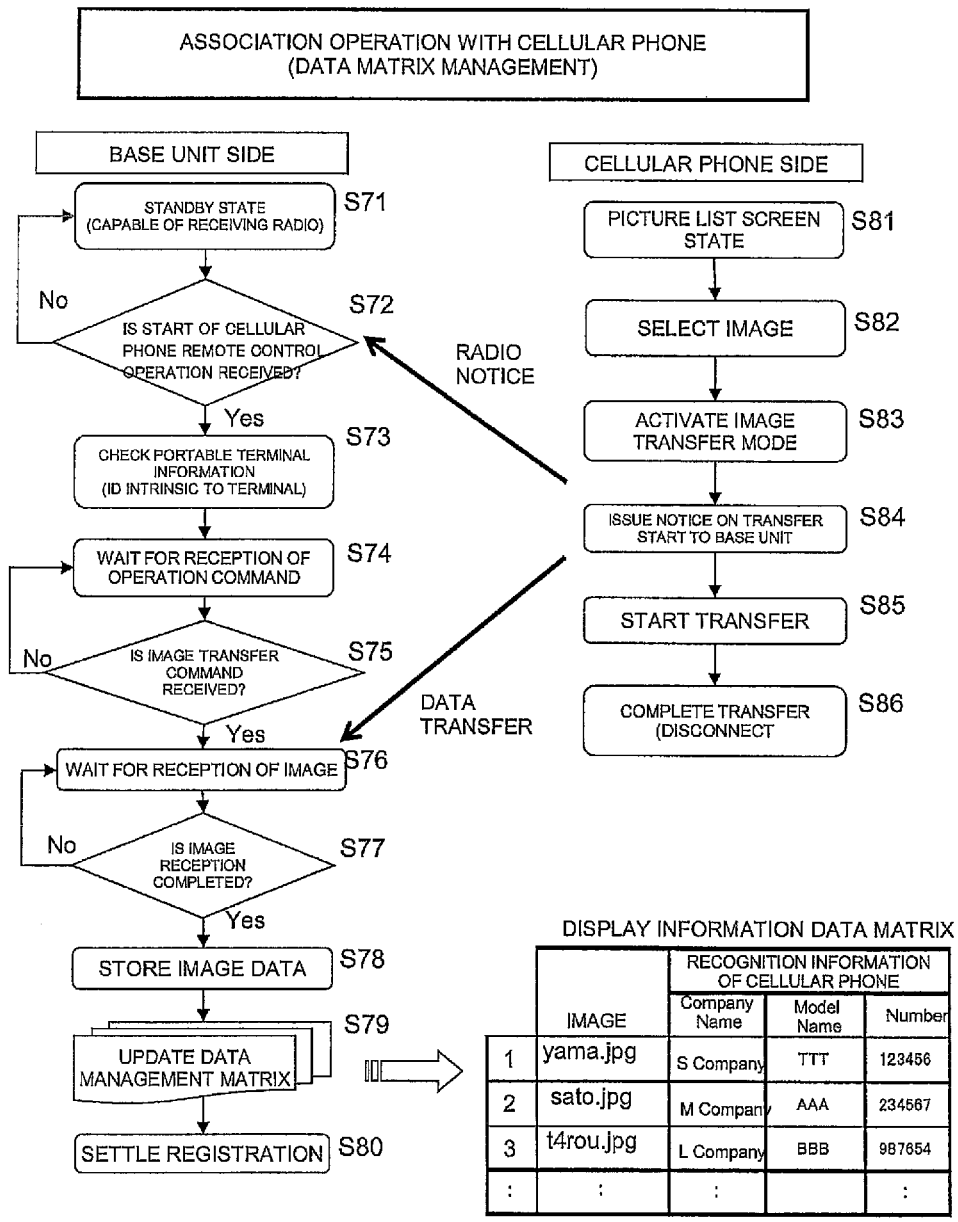
FIG. 11 shows a flowchart (display information data matrix) of associating and registering display information by the cellular phone in the information display system of the present invention.

Next, by using a flowchart of FIG. 11, a description is made of operations of transmitting, to the communication terminal 100, the display information stored in the data storage unit 34 of the cellular phone 201, updating the display information data matrix shown in FIG. 6, and registering the display information in association with the cellular phone 201.

The communication terminal 100 operates as in a flowchart shown on a left side (base unit side) of FIG. 11.

In Step S71, the communication terminal 100 displays the list of the pictures on the display unit 7, and is in a standby state. Specifically, the communication terminal 100 is in the state of FIG. 3(a). Next, in Step S72, the communication terminal 100 determines whether or not to have received a remote control start signal from the cellular phone 201. When the communication terminal 100 has not received the remote control start signal, the routine returns to Step S71. In a case where the communication terminal 100 has received the remote control start signal, then in Step S73, the communication terminal 100 checks the received specification information of the cellular phone 201. As mentioned above, the specification information of the cellular phone 201 is the information such as a cellular phone number, an owner name of the cellular phone, and ID information of the cellular phone.

In the next Step S74, the communication terminal 100 turns to a standby state for reception of an operation command from the cellular phone 201. Next, in Step S75, the communication terminal 100 determines whether or not to have received an image transfer command as the operation command from the cellular phone 201. If the communication terminal 100 has not received the image transfer command, the routine returns to Step S74. In a case where the communication terminal 100 has received the image transfer command, then in Step S76, the communication terminal 100 waits for reception of image data. Then, if the communication terminal 100 has received the image data, then in Step S77, the communication terminal 100 determines whether or not the reception of the image data is completed. If the reception of the image data is not completed, the routine returns to Step S76. If the reception of the image data is completed, the routine shifts to Step S78, where the communication terminal 100 stores the image data in the data storage unit 4. In an event of storing the image data, the communication terminal 100 updates the display information data matrix shown in FIG. 6 in Step S79. In Step S80, the communication terminal 100 settles registration by the above-described processing, and ends this flow.

Meanwhile, in Step S81, the cellular phone 201 is in a state of displaying a picture list screen on the display unit 37 of the cellular phone 201 concerned. In Step S82, from this display state, the cellular phone 201 selects a picture to be displayed on the communication terminal 100. In this flow, the picture is selected from the picture list screen; however, a picture may be selected by displaying pictures one by one on the display unit 37.

Next, in Step S84, the cellular phone 201 activates an image transfer mode thereof. The image transfer mode is activated, for example, by simultaneously pushing the # button and the number 2 button. In the next Step S84, the cellular phone 201 issues a notice on start of the image transfer to the communication terminal 100. This notice is received by the communication terminal 100 in Step S72. Then, in Step S85, the cellular phone 201 starts to transfer the image data. This image data is an image imaged by the camera 39 of the cellular phone 201, an image attached to mail, an image acquired from an SD card, an image acquired from a personal computer, or other image. This transfer of the image data is received by the communication terminal 100 in Step S76. When the transfer of the image data is completed, this flow is ended (Step S86).

<Operations of Registering Display Information in Association with Cellular Phone (Intrinsic ID is Added to Image Data File)>

Figure 12:
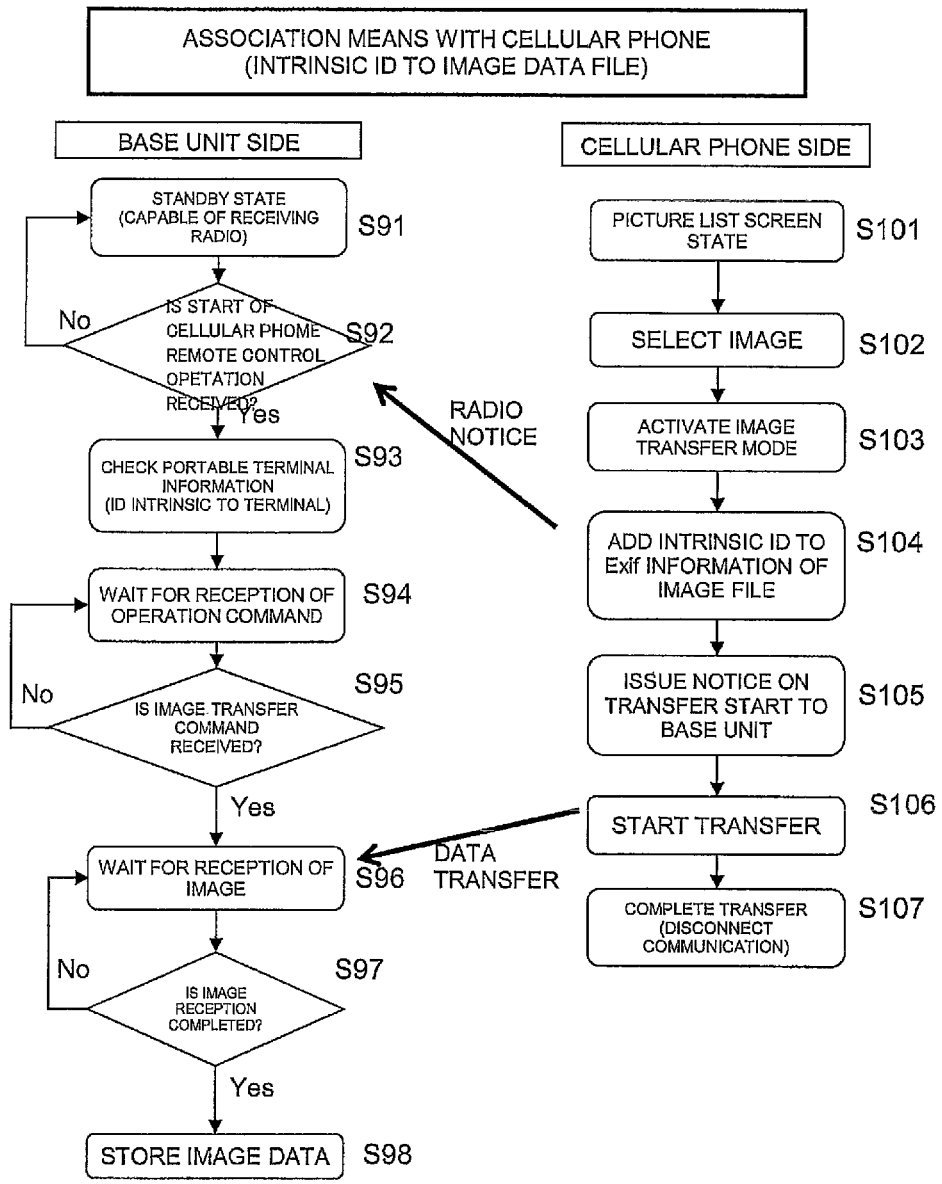
FIG. 12 shows a flowchart (intrinsic ID is added to an image data file) of associating and registering the display information by the cellular phone in the information display system of the present invention.

Next, by using a flowchart of FIG. 12, a description is made of operations of transmitting, to the communication terminal 100, the display information stored in the data storage unit 34 of the cellular phone 201, and adding an intrinsic ID to the image data file, thereby registering the display information in association with the cellular phone 201.

In the flowchart of FIG. 12, Steps S91 to S98 are the same as Steps S71 to S78 of the flowchart of FIG. 11. Note that, in the flowchart of FIG. 12, it is not necessary to update the display information data matrix shown in FIG. 6, and accordingly, in the flowchart of FIG. 12, there is not processing of Steps S79 and S80 in FIG. 11.

Meanwhile, Steps S101 to S107 of a flowchart of the cellular phone are the same as Steps S81 to S86 of the flowchart of FIG. 11, and a different point is that processing (Step S104) for adding an intrinsic ID tag to the Exif information of the image file is added between Steps S83 and S84.

In accordance with this flowchart of FIG. 12, the display information stored in the data storage unit 34 of the cellular phone is registered in the image data file of the communication terminal in association with the cellular phone by the intrinsic ID.

DESCRIPTION OF REFERENCE SIGNS

1: Main control unit
2: RAM
3: ROM
4: Data storage unit
6: Phone/FAX control device
7: Display unit
12: Data communication radio control unit
15: Extension unit control device
44: Data communication radio control unit
45: Angular velocity sensor
46: Acceleration sensor
100: Communication terminal
201 to 203: Cellular phone

The invention claimed is:

1. An information display system comprising a plurality of cellular phones and a communication terminal that performs display control of display information transmitted from the plurality of cellular phones:
    each of the cellular phones comprising:
    a specification information storage unit that stores specification information for specifying the cellular phone itself;
    an operation information creation unit that creates operation information for operating a display image, when a display of the communication terminal displays the display image, by swinging the cellular phone right and left, back and forth, up and down, or drawing a circle with the cellular phone as a gesture operation; and
    a transmission unit that directly transmits by wireless, to the communication terminal, a communication signal including the specification information and the operation information; and
    the communication terminal comprising:
    a reception unit that directly receives the communication signal from each of the cellular phones by wireless;
    a display information storage unit that stores in association the specification information and the display information transmitted from the plurality of cellular phones;
    an operation information storage unit that stores association between the image operation and the operation information in association with each of the cellular phones;
    a display unit for displaying the display information as an image; and
    a display control unit that, when the reception unit has received the specification information, reads out display information of the corresponding cellular phone, the display information being associated with said cellular phone, based on the specification information, from the display information storage unit, and displays the display information as an image on the display unit, and that, when the reception unit has received the operation information, reads out the display image displayed on the display unit and from the operation information storage unit based on the operation information and controls the display image so that any one of a turning over of each one display image, a slide show display, a schedule display, a calendar display and a timepiece display is display.

2. The information display system according to claim 1, wherein the operation information creation unit includes an angular velocity sensor or an acceleration sensor, and the operation information is information to be outputted from the angular velocity sensor or the acceleration sensor in a case where each of the cellular phones is operated to swing right and left, back and forth, up and down or draw a circle as the gesture operation.

3. The information display system according to claim 1, wherein the display information storage unit stores display information for forming a plurality of images, and the display control unit performs the control so that the images can be changed from one to another by the operation information, or that the images can be changed continuously.

4. The information display system according to claim 1, further comprising:
a camera,
wherein display information taken by the camera is transmitted to the communication terminal by the transmission unit and the display information storage unit stores the display information in association with each of the cellular phones.

5. The information display system according to claim 1, further comprising: a registration operation unit that associates the display information stored in the display information storage unit with each of the cellular phones by an instruction signal from each of the cellular phones.

6. The information display system according to claim 1, wherein the transmission unit includes Bluetooth (registered trademark), IrDA, IrSS or IrSimple.

7. A communication terminal comprising:
a reception unit that directly receives a communication signal from each of a plurality of cellular phones by wireless, the communication signal including specification information for specifying one cellular phone itself, and operation information for operating a display image, when a display of the communication terminal displays the display image, by swinging the cellular phone right and left, back and forth, up and down, or drawing a circle with the cellular phone as a gesture operation;
a display information storage unit that stores association between the specification information and the display information transmitted from the plurality of cellular phones;
an operation information storage unit that stores in association the image operation and the operation information in association with each of the cellular phones;
a display unit for displaying the display information as an image; and
a display control unit that, when the reception unit has received the specification information, reads out display information of the corresponding cellular phone, the display information being associated with the cellular phone, based on the specification information from the display information storage unit, and displays the display information as an image on the display unit, and that, when the reception unit has received the operation information, reads out the display image displayed on the display unit and from the operation information storage unit based on the operation information and controls the display image so that any one of the turning over of each one display image, a slide show display, a schedule display, a calendar display and a timepiece display is displayed.

8. A cellular phone for transmitting with a communication terminal including a reception unit that directly receives a communication signal from each of a plurality of cellular phones by wireless, a display information storage unit that stores in association specification information and display information transmitted from the plurality of cellular phones, an operation information storage unit that stores association between an image operation and operation information in association with each of the cellular phones, a display unit for displaying the display information as an image, and a display control unit that, when the reception unit has received the specification information, reads out display information of the corresponding cellular phone, the display information being associated with said cellular phone, based on the specification information, from the display information storage unit, and displays the display information as an image on the display unit, and that, when the reception unit has received the operation information, reads out the display image displayed on the display unit and from the operation information storage unit based on the operation information and controls the display image so that any one of the turning over of each one display image, a slide show display, a schedule display, a calendar display and a timepiece display is displayed,
the cellular phone comprising:
a specification information storage unit that stores specification information for specifying the cellular phone itself;
an operation information creation unit that creates operation information for operating a display image, when a display of the communication terminal displays the display image, by swinging the cellular phone right and left, back and forth, up and down, or drawing a circle with the cellular phone as a gesture operation; and
a transmission unit that directly transmits by wireless, to the communication terminal, a communication signal including the specification information and the operation information.

9. An information display method wherein a cellular phone including a specification information storage unit that stores specification information for specifying the cellular phone itself, and a transmission unit that directly transmits by wireless to a communication terminal, and a communication terminal including a reception unit that directly receives the communication signal from each of a plurality of cellular phone by wireless, a display information storage unit that stores in association the specification information and the display information transmitted from the plurality of cellular phones, an operation information storage unit that stores association between the image operation and the operation information in association with each of the cellular phones, and a display unit for displaying the display information as an image,
the information display method performed by the cellular phone comprising the steps of:
creating operation information for operating a display image, when a display of the communication terminal displays the display image, by swinging the cellular phone right and left, back and forth, or up and down, or drawing a circle with the cellular phone as a gesture operation;
directly transmitting by wireless, to the communication terminal, a communication signal including the specification information and the operation information, and
the information display method performed by the communication terminal comprising the steps of:
directly receiving the communication signal from each of the cellular phones by wireless;
reading out, upon receiving the specification information in the receiving step, display information of the corresponding cellular phone, the display information being associated with said cellular phone, based on the specification information, from the display information storage unit, and displaying the display information as an image on the display unit;

and reading out, upon receiving the operation information in the receiving step, the display image displayed on the display unit and from the operation information storage unit based on the operation information and controlling the display image so than any one of the turning over of each one display image, a slide slow display, a schedule display, a calendar, and a timepiece display is displayed.

10. The information display system according to claim 2, wherein the display information storage unit stores display information for forming a plurality of images, and the display control unit performs the control so that the images can be changed from one to another by the operation information, or that the images can be changed continuously.

11. The information display according to claim 1, wherein the cellular phone comprises a remote control starting button for energizing a remote control unit.

\* \* \* \* \*